United States Patent [19]

Passer et al.

[11] 4,259,569
[45] Mar. 31, 1981

[54] CODE SENSING SYSTEM

[75] Inventors: Barry E. Passer, Ithaca; George A. Sculley, Endicott, both of N.Y.

[73] Assignee: NCR Corporation, Dayton, Ohio

[21] Appl. No.: 39,002

[22] Filed: May 14, 1979

[51] Int. Cl.³ .................. G06K 7/14; G06K 13/07; G06K 19/06

[52] U.S. Cl. .................. 235/463; 235/476; 235/494

[58] Field of Search .................. 235/494, 476, 463; 250/555

[56] References Cited

U.S. PATENT DOCUMENTS

| | | | |
|---|---|---|---|
| 3,211,470 | 10/1965 | Wilson | 235/494 |
| 3,220,301 | 11/1965 | Koonz et al. | 235/494 |
| 3,248,030 | 4/1966 | Ganzhorn | 235/476 |
| 3,409,760 | 11/1968 | Hamisch | 235/494 |
| 3,418,456 | 12/1968 | Hamisch et al. | 235/494 |
| 3,639,730 | 2/1972 | Higginbotham et al. | 235/476 |
| 3,951,251 | 4/1976 | Zaccagnino, Jr. | 235/476 |

Primary Examiner—Daryl W. Cook
Attorney, Agent, or Firm—J. T. Cavender; Wilbert Hawk, Jr.; Richard W. Lavin

[57] ABSTRACT

A transition code processing system which includes a record member on which is located a plurality of bar code symbols, each of which comprises a data channel and a clocking channel. The record member is inserted into a data terminal device and intermittently driven through a printing station in which a sensing member senses the data channel out of phase with the sensing of the clocking channel and generates signals in response thereto. A circuit coupled to the sensing member will process the generated signals and transmit the processed signals to a utilization device. Upon processing the signals representing the last bar code symbol on the record member, the circuit will generate a control signal for stopping the movement of the record member through the printing station, thereby conditioning the record member for a subsequent printing operation.

20 Claims, 10 Drawing Figures

FIG. 1
FIG. 2
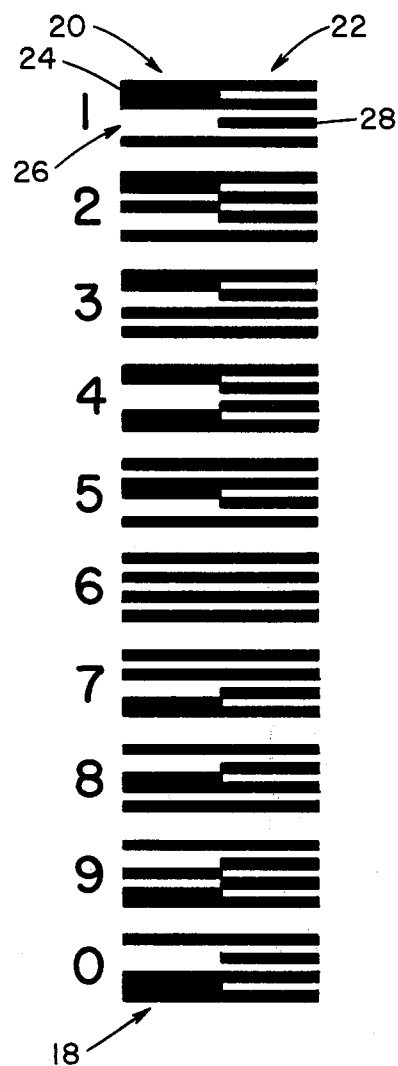
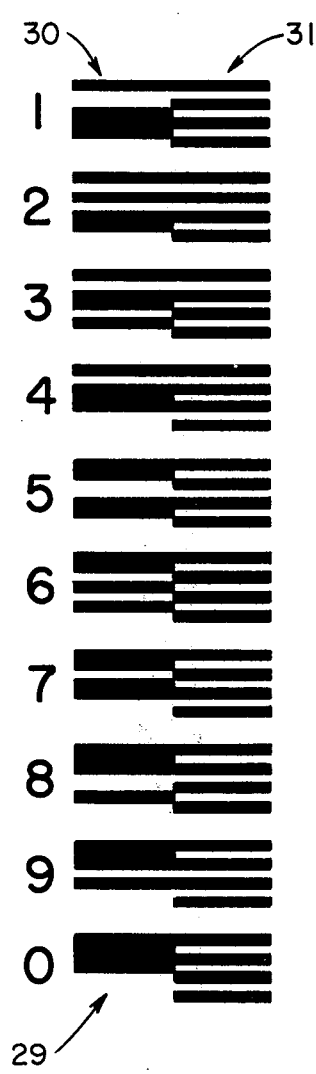

| CHARACTER | REGULAR CHARACTERS | END OF CODE CHARACTERS |
|---|---|---|
| 1 | 1 1 1 0 0 0 1 | 1 0 0 1 1 1 0 |
| 2 | 1 1 0 1 0 0 1 | 1 0 1 0 1 1 0 |
| 3 | 1 1 0 0 1 0 1 | 1 0 1 1 0 1 0 |
| 4 | 1 1 0 0 0 1 1 | 1 0 1 1 1 0 0 |
| 5 | 1 0 1 1 0 0 1 | 1 1 0 0 1 1 0 |
| 6 | 1 0 1 0 1 0 1 | 1 1 0 1 0 1 0 |
| 7 | 1 0 1 0 0 1 1 | 1 1 0 1 1 0 0 |
| 8 | 1 0 0 1 1 0 1 | 1 1 1 0 0 1 0 |
| 9 | 1 0 0 1 0 1 1 | 1 1 1 0 1 0 0 |
| 0 | 1 0 0 0 1 1 1 | 1 1 1 1 0 0 0 |

CODE SENSING SYSTEM

CROSS-REFERENCE TO RELATED APPLICATIONS

BAR CODE READER, co-pending application Ser. No. 39,013, filed on even date herewith, invented by Barry E. Passer and George A. Sculley, assigned to the NCR Corporation;

BAR CODE SYMBOLS, co-pending application Ser. No. 38,999, filed on even date herewith, invented by Barry E. Passer and George A. Sculley, assigned to the NCR Corporation.

BACKGROUND OF THE INVENTION

This invention relates to transition code processing system and more particularly to a system for generating signals representing information stored in the form of black and white coded bars for use in a data processing system.

In present-day data processing systems, the use of bar code symbols on labels or articles as a means for acquiring data at a point of sale is well-known. In reading these bar code labels, it is necessary to provide a clock pulse or other type of synchronizing signal in order that the information be properly entered from the sensing device to the utilization device. It is further necessary to provide an accurate time relationship between the movement of the sensing device with respect to the bar code symbols and the clock pulse in order for the information received to be accurately decoded. To meet these requirements, prior bar code recognition systems such as disclosed in U.S. Pat. No. 2,952,008 and U.S. Pat. No. 3,409,760 provide a separate clock or timing symbol adjacent the bar code symbol, both symbols being sensed simultaneously. Such an arrangement provides the clock pulses which bore a direct relationship to the information to be sensed. However, the requirement for controlled movement of the sensing device with respect to the bar code symbols was still important. When the movement between the sensing device and the bar code symbols was intermittent, the arrangement of prior bar code symbols and their associated sensing systems was found inadequate to functionally operate under this intermittent condition. It is therefore the primary object of this invention to provide a unique coding arrangement in which a plurality of coded symbols are capable of producing information independent of the speed of movement of the coded symbols past the sensing device while still being self-clocking. It is a further object of this invention to provide a code sensing system in which the movement of the bar code label past the sensing device is controlled by the signals generated in response to the sensing of the bar code label by the sensing device.

SUMMARY OF THE INVENTION

In order to fulfill these objects, there is provided a coding arrangement in which a bar code label comprising a plurality of bar code symbols arranged to provide a data channel and a clocking channel is sensed by a sensing member when the label is moved past the sensing member by an intermittent drive member such as the drive motor of a printing mechanism. The sensing member senses the clocking channel in an offset manner with respect to the sensing of its corresponding data channel. The bar code label is located on a record member which is inserted into a terminal device and driven by an intermittent motor drive mechanism to a printing position to enable data to be printed on the record member. During the intermittent movement of the record member to the printing postion, the sensing member located in the terminal device senses both the data channel and the clocking channel to generate the appropriate signals for outputting the coded data representing each character sensed to the terminal device for a subsequent decoding operation and to control the motor drive mechanism of the terminal device to disable the movement of the record member while the terminal device is generating data to complete the processing of the record member. The bar code symbols are arranged to provide the necessary motor drive control signals when the last bar code symbol is sensed by the sensing member.

BRIEF DESCRIPTION OF THE DRAWINGS

Additional advantages and features of the present invention will become apparent and fully understood from a reading of the following description taken together with the annexed drawings.

FIG. 1 is a graphic representation of the bar code symbols together with its representative coded character in accordance with the present invention.

FIG. 2 is a graphic representation of the end-of-code bar code symbol together with its representative coded character in accordance with the present invention.

DESCRIPTION OF THE PREFERRED EMBODIMENT

Figure 3:
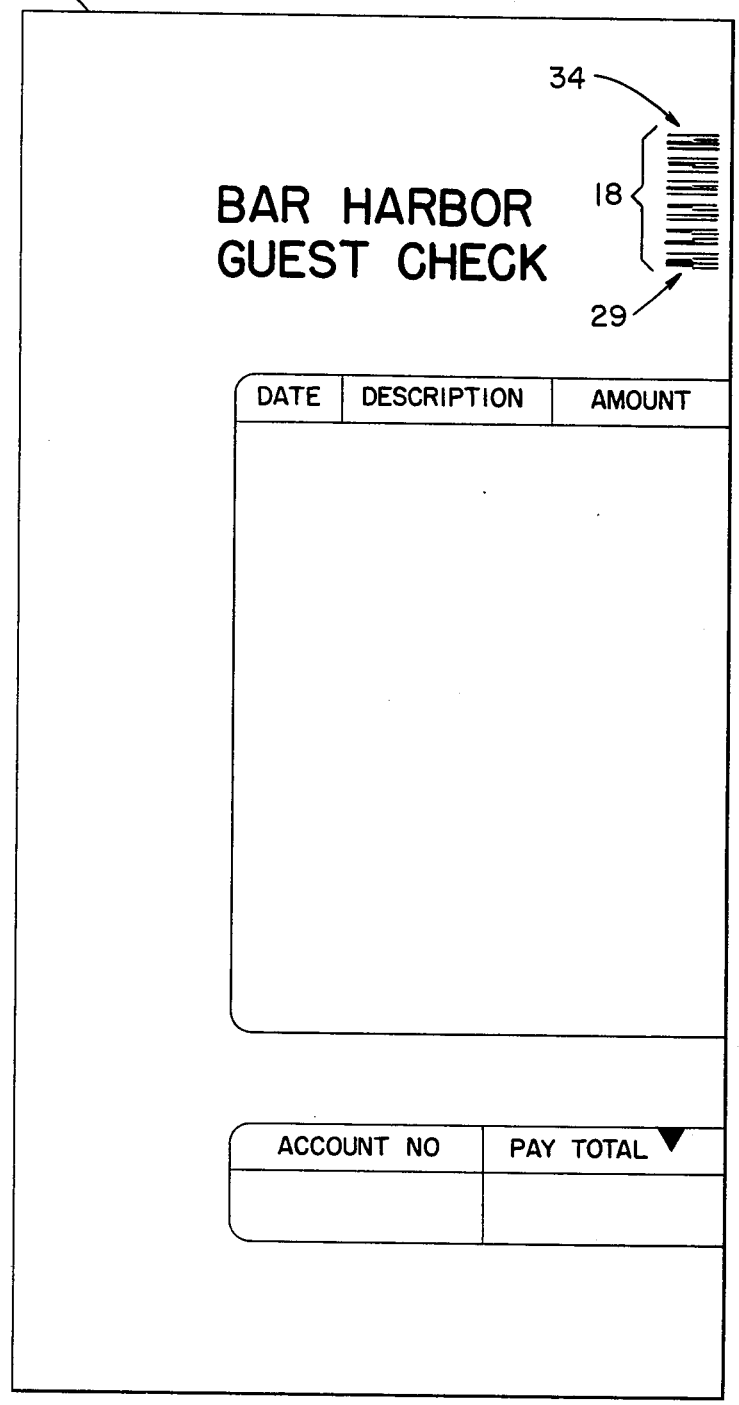
FIG. 3 is a plan view of the record member on which is located a bar code label.

Referring now to FIG. 1, there is shown a graphic representation of the system of a coded indicia such as bar code symbols utilized in the present invention. As shown in FIG. 1, each bar code symbol generally indicated by the numeral 18 includes a character bar code symbol 20 and a clock bar code symbol 22. The character bar code symbols 20 are arranged to be representative of each of the numerical characters 0-9 inclusive and which form a data channel when located on an item to be processed. Each of the bar code symbols 20 comprise a series of black 24 and white 26 bars of various thicknesses with each of the bar code symbols 20 and 22 being composed of seven equally wide data elements called modules, wherein each module may be white or black. In sensing the bar code symbols 20 and 22, each white module or space is assigned the value of 0 while a black module is assigned the value of 1 in a manner that is well-known in the art. It will be noted that the first and last bar of each character bar code symbol 20 is black, which characteristic is used in the control of the operation of a motor drive mechanism in a manner to be described hereinafter. By using binary bits for the black and white module representations, each bar code symbol 20 is arranged to provide a 7-bit pattern. Thus as shown in the table in FIG. 5, the decimal or character 1 may be represented in the bar code symbols 20 of FIG. 1 by the 7-bit pattern 1110001. In keeping with this format, the decimal 1 would be comprised of a black bar of a 3-bit width, followed by a white bar or space of a 3-bit width and a 1-bit wide bar.

As previously described, associated with each of the character bar code symbols 20 (FIG. 1) is a second bar code symbol 22 representing clock signals and comprising four equally spaced black bars 28 each of which function as a bit location reference for the corresponding bits of the numerical character in the character symbol 20 in a manner that will be described more fully hereinafter. This bar code arrangement taken in conjunction with its associated character bar code symbol 20 allows each coded character to be self-clocking and thereby independent of the speed of movement of the bar code label past the sensing member. While the bar code symbols 20 and 22 of FIG. 1 areshown attached, it is obvious that they may be separated and still function for their intended purpose provided the code symbols 20 and 22 are aligned as shown in FIG. 1.

Referring now to FIG. 2, there is shown a graphic representation of a second set of bar code symbols generally indicated by the numeral 29 which are used as the last or end-of-code character bar code symbol in the data track of a bar code label. Each of the end-of-code symbols 29 include a character bar code symbol 30 which is similar to its corresponding character bar code symbols 20 (FIG. 1) in that the first bar is always black. The remaining bar positions 2–7 inclusive are inverted, that is, a 1 bit appears in the end-of-code character symbol 29 where a 0 bit was in the same location in the corresponding character bar code symbol 20. This arrangement is shown in the table in FIG. 5. It should be noted that in either case, each bar code symbol includes four binary bit 1's which characteristic is used as a parity check. The end-of-code bar code symbols 29 has an associated clock bar code symbol 31 (FIG. 2) similar to that of the clock bar code symbol 22 (FIG. 1) and which functions in the same manner.

Referring now to FIG. 3, there is shown a plan view of a record member 32 such as a check member which is issued by a motel or hotel and on which the customer charges are printed. Upon registration, the customer is assigned a check member 32 on which is printed a bar code label 34 which may comprise any number of bar code symbols 18 (FIG. 1) together with an end-of-code bar code symbol 29 (FIG. 2) comprising an account number. Any charges incurred by the customer are printed on the check by inserting the check into a printing mechanism located in a terminal device and inserting the amount of the charge into the printing mechanism through a keyboard in a manner that is well-known in the art. A motor drive member in the terminal device will drive the check member 32 to a position adjacent the printing members in the printing mechanism which prints the amount of the charge on the check member 32. During an initial movement of the check member 32, a sensing member located in the terminal device will read the bar code label 34, enabling the terminal device to identify the customer's account number so that the amount being printed can be added to a running total of the entries on the check member. After verifying the account number, the terminal device will notify the operator to insert the amount of the charge into the keyboard after which the printing operation takes place. At check-out time, the total amount due is printed on the check for payment by the customer.

Figures 4, 5:
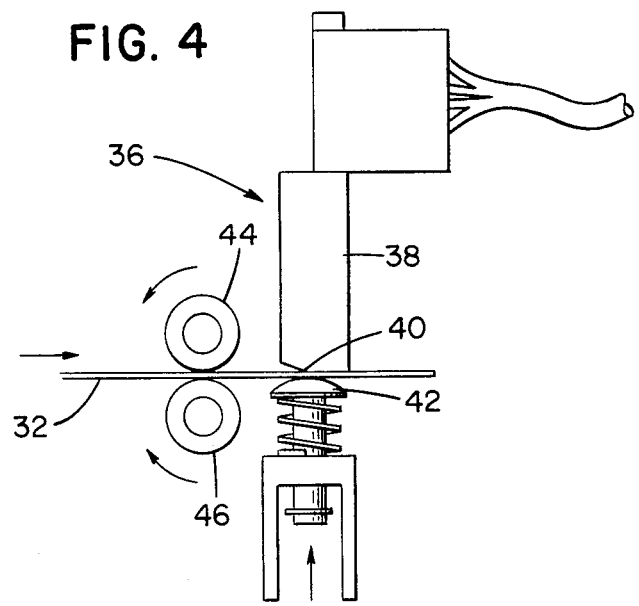
FIG. 4 is a side view of a portion of the printing station in which the record member is positioned adjacent the sensing member.
FIG. 5 is a table showing the code structure of the bar code symbols shown in FIGS. 1 and 2.

Referring now to FIG. 4, there is shown a side view of a portion of the printing station showing the sensing assembly generally indicated by the numeral 36 which includes a sensing member 38 having a contact portion 40 in which are located a pair of off-set apertures (not shown) positioned adjacent the check member 32 (FIG. 3). As fully disclosed in the previously-cited co-pending application of Passer et al., Ser. No. 39,013, which application is fully incorporated into this application by reference, each aperture in the contact portion 40 of the sensing member 38 contains a plurality of optical fibers, some of which are in communication with a light emitting diode (LED) while the remaining optical fibers are in communication with a photo-transistor which in a manner well-known in the art will output an analog waveform signal 42 (FIG. 8A) in response to the sensing of the clock channel 22 (FIG. 1) of the bar code label 34 (FIG. 3) and the analog signal 44 (FIG. 8A) in response to the sensing of the data or character channel 20. The check member 32 is urged into engagement with the contact portion 40 of the sensing member 38 by a spring-urged compensator member 42. A pair of drive rollers 44, 46 engage the check member 32 and when operated by a motor drive member (not shown) will move the check member a predetermined distance to position a print line on the check member adjacent the printing mechanism enabling the printing mechanism to print the required data on the check member in a manner that is well-known in the art.

Figure 6:
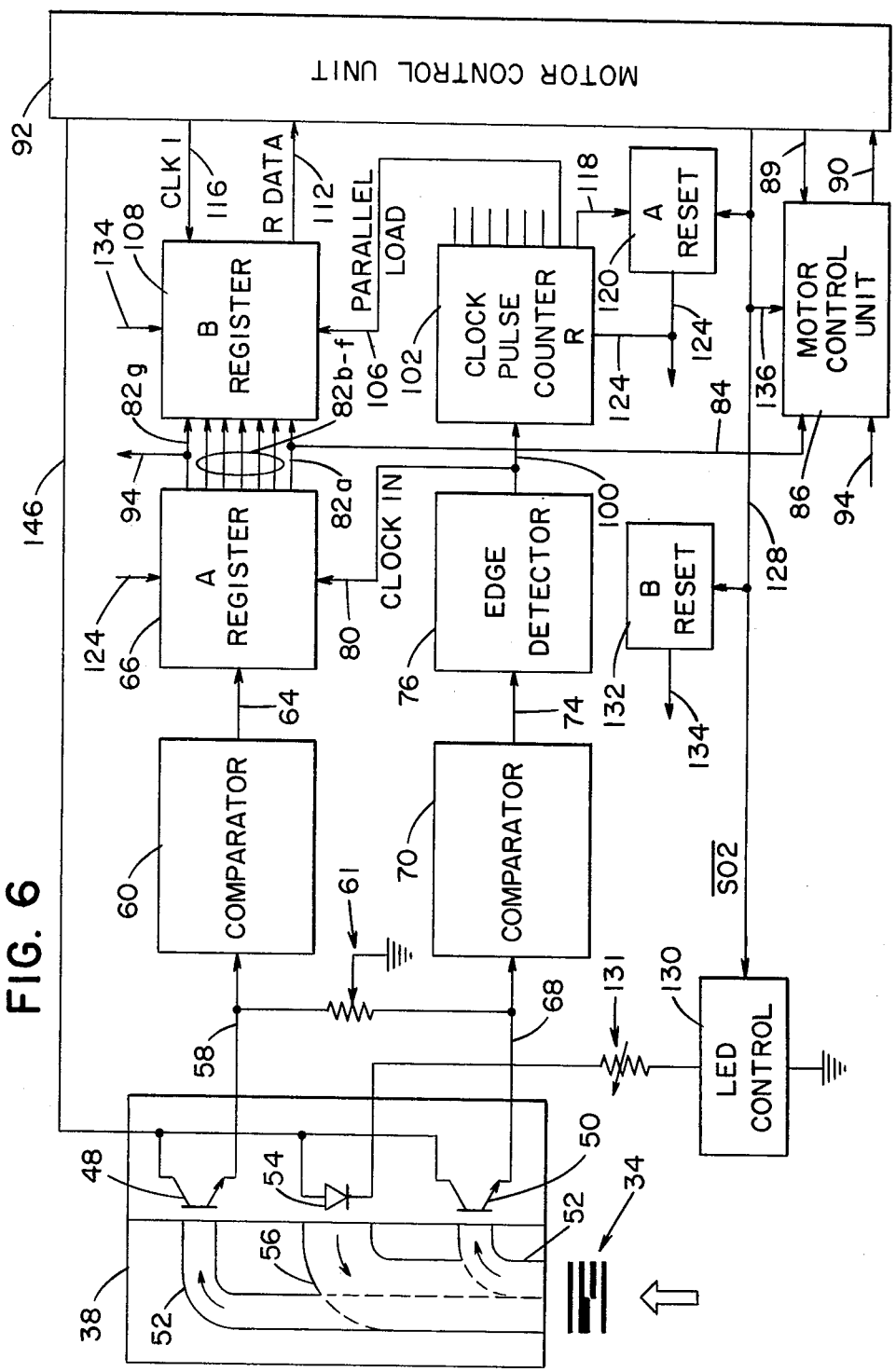
FIG. 6 is a simplified block diagram of the sensing and motor control circuits in accordance with the present invention.

Referring now to FIG. 6, there is shown a simplified block diagram of the sensing and motor control circuit employed in the present embodiment. As shown in FIG. 6, the sensing member 38 includes a pair of photo-transistors 48, 50, each of which receives light rays through a plurality of optical fibers positioned in a channel 52, the light rays being reflected from a bar code label 34 located on the check 32. The light source comprises a light-emitting diode 54 which, when energized, will transmit light rays through a plurality of optical fibers located in a channel 56 to the bar code label 34. The photo-transistor 48 will receive the light rays reflected from the bar code symbols 20 (FIG. 1) representing the data characters, while the photo-transistor 50 will receive light rays reflected from the bar code symbols 22 representing the clock signals. As previously described, the channel 52 in the sensing member 38 positioned adjacent the clock bar code symbols 22 (FIG. 1) is offset to the channel 52 positioned adjacent the data character bar code symbols 20. With this arrangement, the photo-transistor 48 will generate the data analog waveform signal 44 (FIG. 8A and 8B) out of phase with the clock analog waveform signal 42 generated by the photo-transistor 50.

In the present embodiment, the channel 52 positioned adjacent the character bar code symbols 20 is offset to the channel positions adjacent the clock bar code symbol 22 by a distance equal to one-half the width of a module, which is represented by the black bar 28 (FIG. 1) in the clock bar code symbols 22.

The data or character analog signal 44 (FIG. 8A and 8B) is transmitted from the photo-transistor 48 (FIG. 6) over line 58 to a comparator 60 which digitizes the analog signal 44 to output the square wave signal 62

(FIG. 8A) over line 64 to the input of a serial-to-parallel A shift register 66. Simultaneously with this operation, the photo-transistor 50 will generate the clock analog signals 42 (FIG. 8A) which are transmitted over line 68 to the comparator 70 which digitizes the input analog signal to output the squarewave signals 72 (FIG. 8A) over line 74 to an edge detector 76. As indicated by the dotted lines in FIG. 8A, the rising edge of each of the clock pulses 72 occurs at the middle of the square wave data pulses 62 corresponding to one of the bit positions B0-B6 inclusive due to the offset location of the clock channel sensing aperture of the sensing member 38 with respect to the data channel sensing aperture. p The edge detector 76 (FIG. 6), will, upon sensing the rising and falling edges of each of the clock pulses 72 (FIG. 8A), generate a series of clock pulses 78 (FIG. 8A) which are transmitted over line 80 to the A register 66, thereby loading the data signals 62 into the register. As the data signals 62 are loaded into the A register 66 under the control of the clock pulses 78, the signals 66 will appear on the output lines 82a-g inclusive of the register 66 with the first data bit B0 appearing on the line 82a, while the seventh data bit B6 appearing on the output line 82g. As previously described, the first bit B0 of each of the bar code symbols 20 and 29 (FIG. 1 and 2) are always black, thereby representing the binary bit 1. As this signal appears on the output line 82a of the register 66, the signal will be transmitted over line 84 to a motor control unit 86 which receives over line 89 the $\overline{\text{MOTOR ON}}$ signal 98 (FIG. 8A and 8B) which is low when the motor drive mechanism is operating.

If the bar code symbol being sensed by the sensing member 38 is an end-of-code symbol 29 (FIG. 2) in which the last bit position is always a space or white bar thereby producing a low signal 83 (FIG. 8B), this signal being inverted in a manner to be described hereinafter and when appearing on the output line 94 (FIG. 6) wil be transmitted to the motor control unit 86. The control unit 86 in response to receiving the high signal over line 84 and the high signal 83 raises the Motor Inhibit signal 88 (FIG. 8B) over line 90 to the motor control unit 92, resulting in the stopping of the motor drive mechanism in the terminal device. Stopping of the drive mechanism at this time allows the terminal device to decode the data transmitted from the sensing member 38, verifies the decode account No. and to indicate to the operator to insert the data that is to be printed on the check member 32 into the terminal device.

The clock pulses 78 (FIG. 8A) generated by the edge detector 76 is also transmitted over line 100 (FIG. 6) to a clock pulse counter 102 which outputs the parallel load signal 104 (FIGS. 8A and 8B) upon the occurrence of the seventh clock pulse 78. The signal 104 is tranmitted over line 106 to a ten bit parallel-to-serial B shift register 108 loading the data bits 62 (FIG. 8A) appearing on the output lines 82a-g inclusive of the A register 66 into the B register 108. The data signals 62 (FIG. 8A) stored in the B register 108 are subsequently clocked out in an inverted form as R Data signals 110 (FIG. 8A) over line 112 to the motor control unit 92 and then subsequently to the terminal device in response to receiving the clock in (CLKI) pulses 114 (FIG. 8A) from the motor control unit 92 over line 116. During the time the R Data signals 110 are being strobed out of the B register 108 by the motor control unit 92 over line 112, the data signals 62 (FIG. 8A) representing the next bar code symbol 18 (FIG. 1) sensed by the sensing member 38 is being loaded into the register 66 in the manner that will now be described.

The clock pulse counter 102 (FIG. 6) will output a high pulse over line 118 upon counting the eighth clock pulse 78 (FIG. 8A) transmitted from the edge detector 76 over line 100. The pulse appearing on line 118 is transmitted to the A reset circuit 120 which outputs the control signal 122 (FIG. 8A) over line 124 to reset the A register 66 and the clock pulse counter 102 enabling the A register 66 to accept the data signals 62 being transmitted from the comparator 60 over line 64 as a result of sensing the next bar code symbol 18 (FIG. 1). It will thus be seen that the sensing system disclosed in FIG. 6 will output data in binary form in accordance with the sensing of the bar code symbols of the bar code label 34 in which the data is characterized by the clock signals 78 which always occurs upon the generation of its associated character pulses 62. Thus the data being outputted by the sensing member is independent of the speed of the label past the sensing member 38.

Figure 7A:
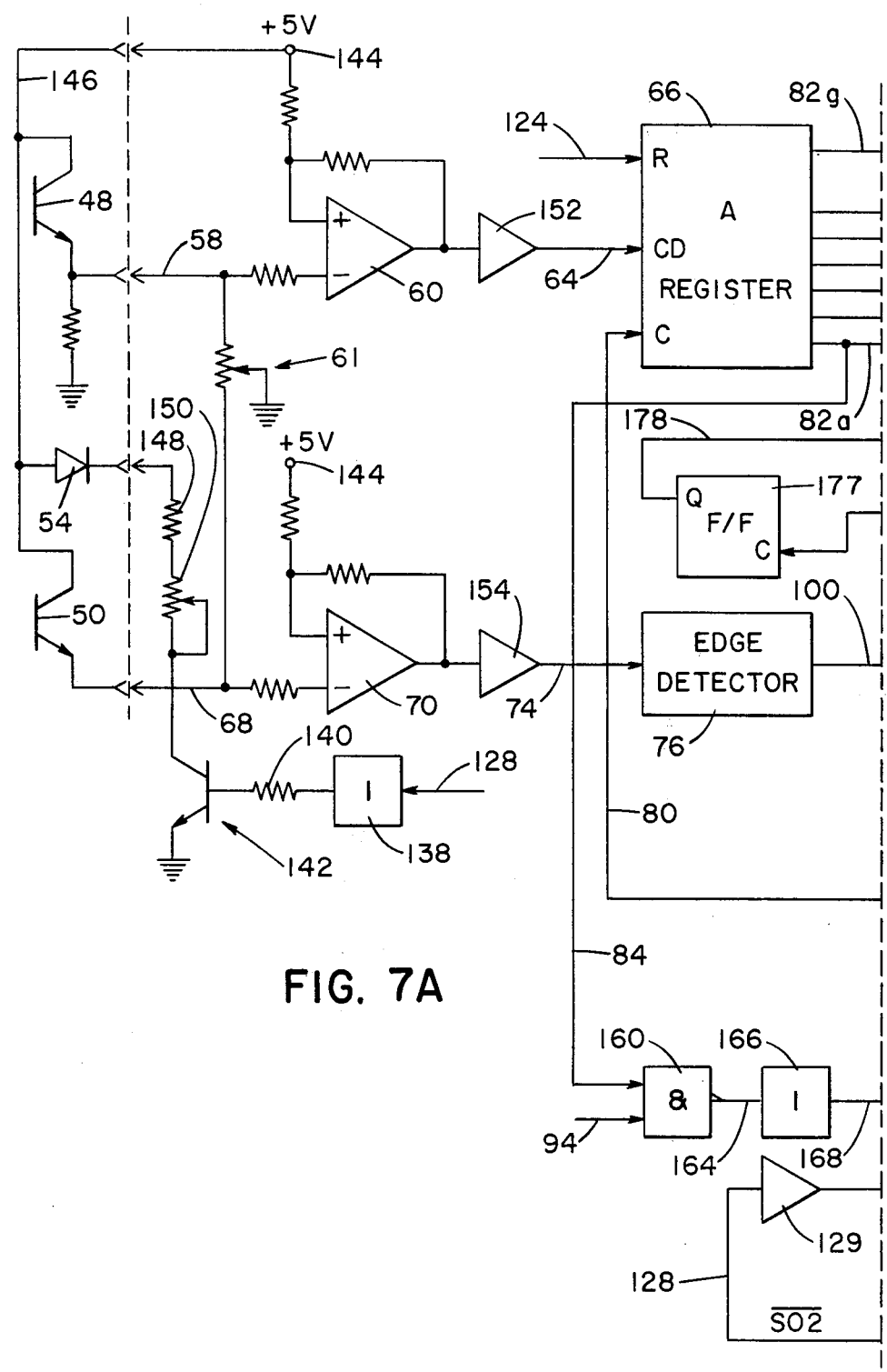
FIGS. 7A and 7B taken together are a more detailed schematic diagram of the circuit of FIG. 6.
Figure 7B:
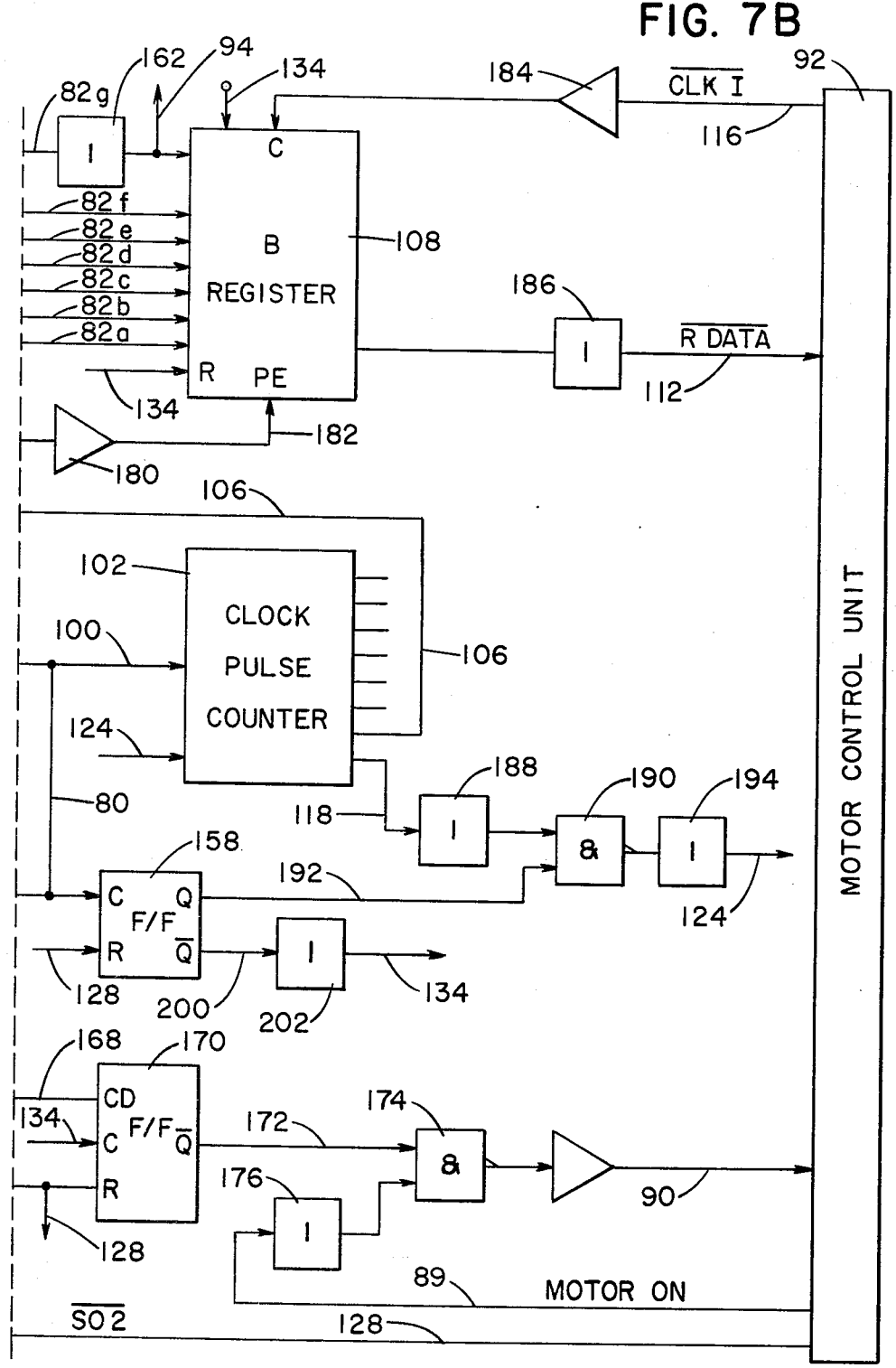
Figure 8A:
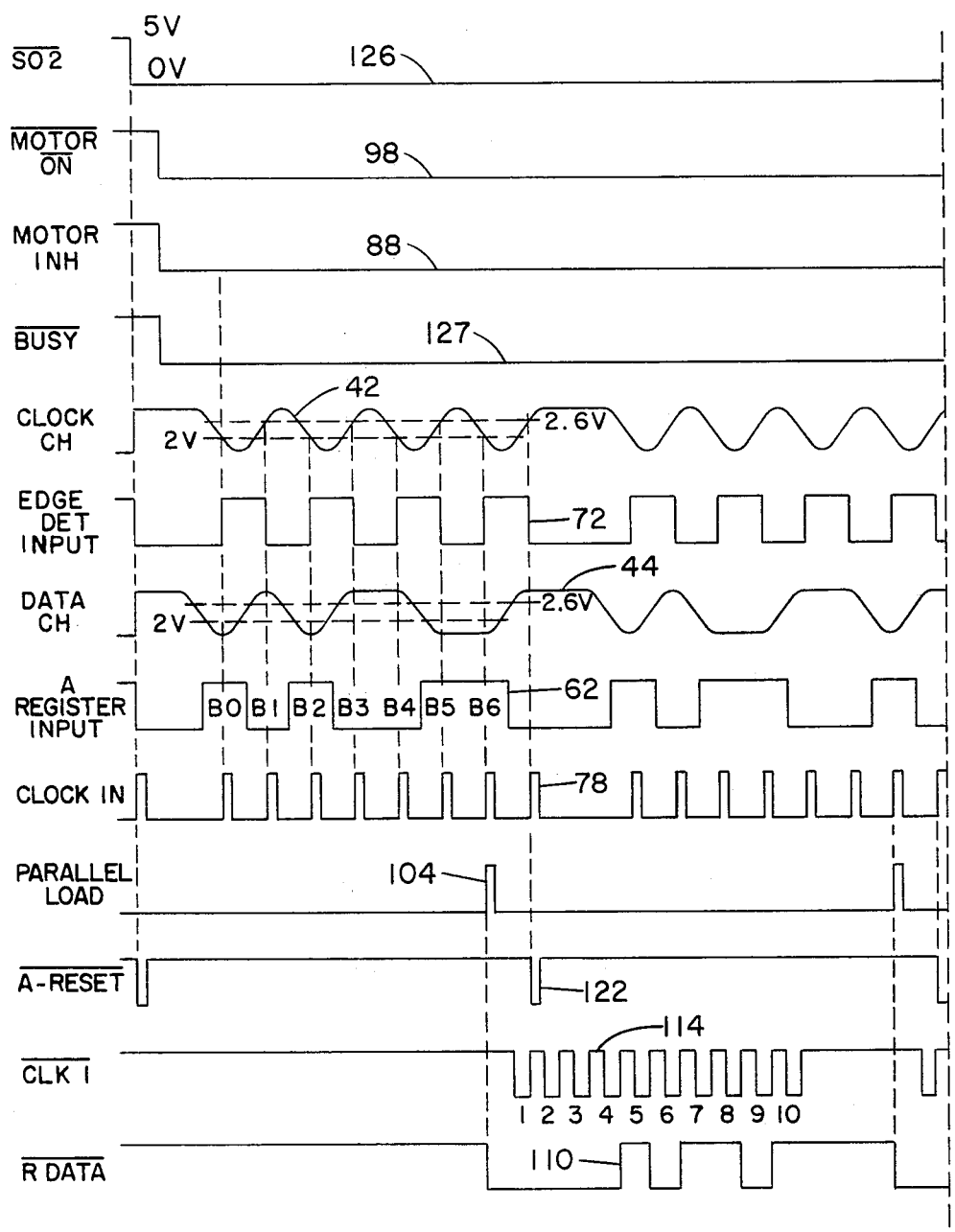
FIGS. 8A and 8B taken together show a plurality of waveforms illustrating the operation of the circuits shown in FIG. 6 and FIGS. 7A and 7B.
Figure 8B:
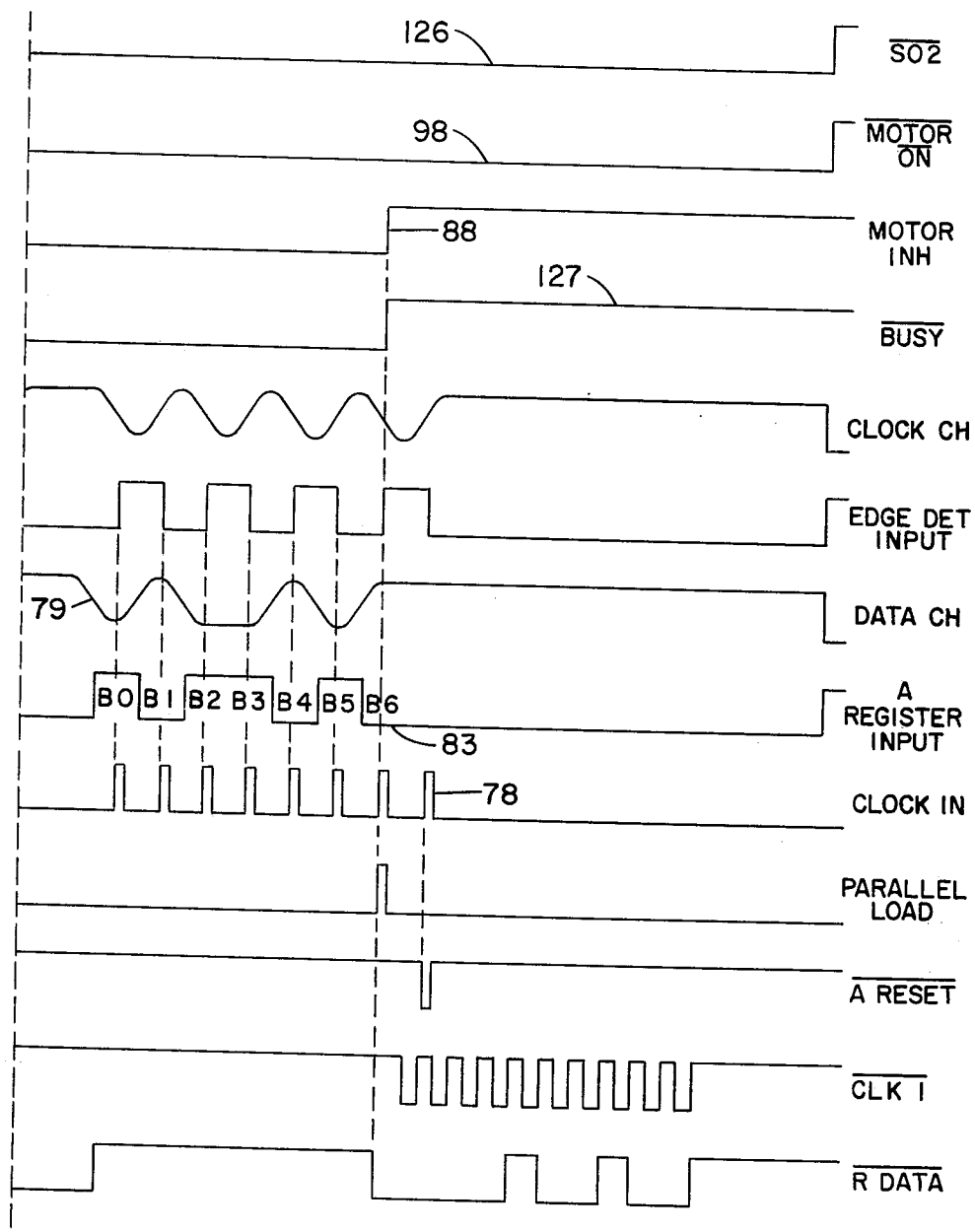

As shown in FIG. 8A a normally high reset $\overline{\text{S02}}$ signal 126 is outputted over line 128 (FIG. 7A and 7B). Prior to the sensing of a label 34, the signal $\overline{\text{S02}}$ is dropped, which signal is transmitted over line 128 to a LED control circuit 130 (FIG. 6) which outputs an energizing pulse through an adjustable potentiometer 131 to the LED 54 resulting in the energizing of the LED 54 thereby initiating a new sensing operation. The signal $\overline{\text{S02}}$ is also transmitted over line 136 to the motor control unit 86 conditioning the unit to be operated. The signal $\overline{\text{S02}}$ is also transmitted to the A reset circuit 120 and the B reset circuit 132 enabling the circuit for operation. At the completion of the reading of the label 34 on the record member 32 (FIG. 3), the signal $\overline{\text{S02}}$ is raised deenergizing the LED 54. The high signal $\overline{\text{S02}}$ is also transmitted to a B reset circuit 132 which outputs a reset pulse over line 134 to the B register 108, resetting the register for the reading of the next label. The signal $\overline{\text{S02}}$ is also transmitted over line 136 to the motor control unit 86 pulling down the Motor Inhibit signal 88 enabling the motor drive mechanism to move the check member to a printing position if required or if the printing operation has been completed, conditioning the system for the sensing of a bar code label 34 (FIG. 3) on a new check member. The dropping of the signal 88 results in the dropping of the BUSY signal 127 indicating the operation of the motor. As shown in FIG. 6, a balance control 61 is utilized to adjust the output voltage levels of the photo-transistors 48 and 50.

Referring now to FIGS. 7A and 7B, there is shown a more detailed schematic diagram of the circuit shown in FIG. 6. As shown in FIG. 7A, the initiating signal $\overline{\text{S02}}$ which is generated over line 128 from the motor control unit 92 (FIG. 7B) is transmitted to an inverter 138 which outputs the inverter signal through a dropping resistor 140 switching a transistor 142 into a state of conduction, thereby grounding a 5 volt power supply 144 (FIG. 7A) through line 146, the light emitting diode (LED) 54 and through the resistor and a potentiometer 148, 150, enabling the diode 54 to illuminate the bar code label 34 through the optical fibers positioned in the channel 56 (FIG. 6). The light reflected from the character bar code symbols 20 (FIG. 1) is transmitted through the optical fibers positioned in the channel 52 (FIG. 6) to the photo-transistor 48 which outputs the analog signal 44 (FIG. 8A) over line 58 to the inverting input of a standard linear integrated comparator 60 which may be of any well-known type such as Part No.

LM3900 sold by the Naional Semiconductor Corporation of Santa Clara, Calif.

The analog waveform signal 44 (FIG. 8A) is shaped by the comparator 60 to output the squared waveform signal 62 by switching the output voltage when the analog signal reaches fixed voltage levels such as 2 volts and 2.6 volts as shown in the waveform signal 44 (FIG. 8A). The squared waveform signal 62 is transmitted through a driver 152 and over line 64 to the 8-bit A shift register 66, the signal 62 being clocked into the A register by the clock pulses 78 (FIG. 8A) appearing on the output line 100 of the edge detector 76 and transmitted to the clock input of the A register 66 over line 80. The serial-to-parallel shift register 66 is commercially available from the Texas Instruments Corporation of Dallas, Tex. As Part No. SN74LS164.

In a similar manner, the photo-transistor 50 receiving light reflected from the clock bar code symbols 22 (FIG. 1) will output the analog signal 42 (FIG. 8A) over line 68 to the inverting input of 70 which is of the same construction as comparator 60 and which outputs the squared waveform signal 72 in a manner similar to the operation of the comparator 60. The squared waveform signal 72 which is outputted from the comparator 70 is transmitted to a driver 154 and over line 74 to the edge detector 76 which may take the form of any conventional arrangement such as a pair of monostable multivibrators which are commercially available from Texas Instruments Corporation of Dallas, Texas. The edge detector 76 will output the clock pulses 78 (FIG. 8A) upon the occurrence of the rising and falling edges of the squared waveform signal 72 over line 100 to the clock pulse counter 102 which may be comprised of an 8-bit shift register which is commercially available from the Texas Instruments Corporation as Part No. SN74LS164. The clock pulses 78 appearing on line 100 are also transmitted over line 80 to the clock input of the shift register 66 in the manner described previously for loading the signals 62 into the register and also to the clock input of a flip-flop 158 (FIG. 7B) which generates reset signals in a manner to be described hereinafter.

The clocking of the squared waveform signal 62 representing data which is used to identify the character bar code symbol being sensed by the sensing member 38 into the A register 66 under the control of the clock pulses 78 results in the bit signals B0–B6 inclusive (FIG. 8A) appearing on the output lines 82a–82g inclusive of the A register 66. Since the first bit signal B0 (FIG. 8A) is always high, this signal when appearing on the output line 82a is transmitted over line 84 (FIG. 7A) to one input of a NAND gate 160 whose other input is connected over line 94 to the output of the inverter 162. As described previously, the last bit B6 of the waveform 62 associated with each of the character bar code symbols 20 in FIG. 1 is always high, which signal will appear on the output line 94 as low because of the inverter 162 resulting in the NAND gate 160 outputting a low signal over its output line 164. When the sensing member 38 senses the end-of-code character 29 (FIG. 2) in which the last bit position is always a space, the bit signal B6 (FIG. 8B) will be inverted by the inverter 162 which outputs a high signal over line 94 enabling the NAND gate 160 to output a low signal on its output line 164 to the inverter 166 which in turn outputs a high signal over line 168 to the CD input of a flip-flop 170. The flip-flop 170 will output a low signal on its $\overline{Q}$ output over line 172 to one input of a NAND gate 174 whose other input receives a high signal from the inverter 176 on whose input appears the $\overline{\text{MOTOR ON}}$ signal 98 (FIG. 8A) which is normally low when the motor is running. The output signal 88 (FIG. 8B) of the NAND gate 174 transmitted through the driver 175 and over line 90 to the Motor Control unit 92 will inhibit the operation of the motor drive mechanism (not shown) indicating that the bar code label 34 on the member 32 (FIG. 3) has been read. The flip-flops 158 and 170 (FIG. 7B) are commercially available from the Motorola Corporation of Phoenix, Ariz. as Part No. MC14013.

The outputting of the clock pulses 78 (FIG. 8A) over line 100 to the clock pulse counter 102 (FIG. 7B) results in outputting of the pulse 104 (FIG. 8A) over line 106 upon the occurrence of the inputting of the seventh clock pulse 78 into the counter 102. The pulse 104 is transmitted over line 106 to the clock input of a flip-flop 177 (FIG. 7A) toggling the flip-flop to output a high signal for a period of 1 sec. on its Q output line 178 which signal is transmitted through the driver 180 to the PE input of the B register 108 on whose input lines 82a–82g inclusive appears the waveform signals 62 (FIG. 8A) representing in binary form the character sensed by the sensing member 38. The B register 108 is comprised of a pair of parallel-to-serial five bit shift registers which, upon the subsequent generation of the clock-in ($\overline{\text{CLKI}}$) pulses 114 (FIG. 8A) over line 116 (FIG. 7B) by the motor control unit 92 and through the driver 184 will result in the waveform signal 62 being outputted over line 112 in serial form through the inverter 186 which results in the R Data waveform 110 (FIG. 8A) being outputted to the motor control unit 92 for processing by the terminal device. This sequence of events will occur for the sensing of each character bar code symbol 20 (FIG. 1) by the sensing member 38. The B register 108 is commercially available from the Texas Instruments Corporation of Dallas, Texas as Part No. SN74LS96. The flip-flop 177 is available as Part No. SNLS221.

Upon receiving the eighth clock pulse 78 over line 100 from the edge detector 76, the clock pulse counter 102 (FIG. 7B) will output a high signal on the output line 118 which signal is inverted by the inverter 188 and transmitted to one input of the NAND gate 190 on whose other input appears the low signal over line 192 from the Q output of the flip-flop 158. The NAND gate 190 will be enabled to output a high signal to an inverter 194 which outputs the low $\overline{\text{A RESET}}$ signal 122 (FIG. 8A) over line 124 to the reset input of the A register 66 resetting the register to enable the next character waveform signal 62 to be entered. The $\overline{\text{A RESET}}$ signal 122 is also transmitted over line 124 to the clock pulse counter 102 resetting the counter. It will thus be seen that the circuit is in condition to process each of the waveform signals 62 generated by the sensing member 38 until the end-of-code character signal 79 (FIG. 8B) is generated signifying the end of the bar code label 34 resulting in the disabling of the motor in the manner described previously. The clock pulse counter 102 is commercially available as the 8-bit shift register Part No. SN74LS164 which may be the same as that of the A register 66.

After all the data generated by the operationof the sensing member 38 has been processed by the terminal device, the motor control unit 92 will raise the $\overline{\text{S02}}$ signal 126 (FIG. 8A) over line 128 through the driver 129 (FIG. 7A) to the reset input of the flip-flop 170. The flip-flop 170 will output a high signal over line 172 which enables the NAND gate 174 to output the low motor inhibit signal 98 (FIG. 8A) thereby enabling the energizing of the motor drive mechanism to occur resulting in the driving of the check member 32 (FIG. 4) towards a printing position by the operation of the drive wheels 44 and 46. The $\overline{S02}$ signal 126 is also transmitted over line 128 to the flip-flop 158 (FIG. 7B) enabling flip-fop 158 resulting in a high signal appearing on the $\overline{Q}$ output line 200 which signal is inverted by the inverter 202 and transmitted over line 134 to the reset input of the B register 108 resetting the register, thereby conditioning the circuit for a new processing operation.

Although the invention has been described and illustrated with a certain degree of particularity, it is understood that the present disclosure has been made only by way of example, and that numerous changes in the details of construction and the combination and arrangements of parts may be resorted to without departing from the spirit and scope of the invention as hereinafter claimed.

What is claimed is:

1. A system for processing indicia having a plurality of first and second coded symbols in a row comprising:
    means for driving said indicia past a sensing member;
    first means operative to sense each of the first and second coded symbols of the indicia and to generate first electrical signals representing the first coded symbols and second electrical signals representing the second coded symbols;
    first signal processing means for processing said first and second electrical signals in a predetermined manner;
    and logic means responsive to the processing of said first electrical signal for enabling said driving means and responsive to the processing of said second electrical signals by said signal processing means for disabling said driving means.

2. The system of claim 1 in which said indicia includes a plurality of third coded symbols in a row each aligned with one of said first and second symbols and said system further comprising second means operative to sense said third coded symbols and to generate third electrical signals which are representative thereof and second processing means responsive to the generation of said third electrical signals to enable said first signal processing means to process said first and second electrical signals.

3. The system of claim 2 in which said first sensing means senses each of the first and second coded symbols out of phase with the sensing of the corresponding third coded symbols by said second sensing means.

4. The system of claim 3 in which said first and second coded symbols represent encoded information and said third coded symbols represent clocking information enabling said first signal processing means to process said first and second electrical signals.

5. The system of claim 4 in which the first coded symbols comprise a plurality of various width black and white bars with the first and last bar being always black.

6. The system of claim 5 in which the second coded symbols comprise a plurality of various width black and white bars with the first bar being always black and the last bar being always white.

7. The system of claim 6 in which said first signal processing means includes storage means for storing said first and second electrical signals and said second signal processing means includes pulse generator means for outputting clock signals in response to the generation of said third electrical signals enabling said storage means to store said first and second electrical signals.

8. The system of claim 7 in which said disabling means includes third means for sensing the first and last generated signals of said first and second electrical signals, said third sensing means outputting a control pulse enabling said disabling means to disable said driving means upon sensing the first and last generated signals of said second electrical signals.

9. A coded indicia reading system comprising:
    means for intermittently driving a record member through a scan path;
    coded indicia located on said record member having a row of first and second encoded symbols comprising a data track and a clocking track, said second encoded symbols being the last symbol in the row of encoded symbols;
    means mounted adjacent said scan path for sensing the data and clocking tracks of said first and second encoded symbols and generating first electrical signals representing said data track and second electrical signals representing said clocking track;
    first signal processing means for processing said first electrical signals in a predetermined manner in response to the generation of said second electrical signal;
    and logic means responsive to the processing of said first electrical signal representing said first data track for enabling said driving means and further responsive to the processing by said first signals processing means of said first electrical signals generated by said sensing means in sensing said second encoded symbols for disabling said driving means.

10. The system of claim 9 in which said sensing means includes a first detector means for sensing the data track of said first and second encoded symbols and second detector means for sensing the clocking track of said first and second encoded symbols, said first detector means sensing said data track out of phase with the sensing of the clocking track by said second detector means.

11. The system of claim 10 in which the data track of the first encoded symbols comprises a plurality of various width black and white bars representing a data channel with the first and last bars sensed by said first detector means always being black.

12. The system of claim 11 in which the data track of the second encoded symbols comprises a plurality of various width black and white bars representing a data character with the first bar sensed by said first detecting means always being black and the last bar always being white.

13. The system of claim 12 in which the clocking track of said first and second encoded symbols comprises a plurality of equal width black and white bars.

14. The system of claim 13 in which said first signal processing means includes first storage means for storing the electrical signals representing the width of the black and white bars sensed by the first detector means, said system further including second signal processing means for processing said second electrical signals, said second signal processing means includes pulse generator means coupled to said storage means and responsive to the generation of each of said second electrical signals for generating clock pulses for enabling said first storage means to store said first electrical signals.

15. The system of claim 14 which further includes second means coupled to said first storage means for sensing the electrical signals representing the first and last bar in the data track of said first and second encoded symbols stored in said first storage means, said second sensing means outputting control pulses to said disabling means upon sensing the first electrical signals representing the first and last bars of said second encoded symbols stored in said first storage means enabling said disabling means to disable said driving means.

16. The system of claim 15 in which the black and white bars of said clocking track are aligned with corresponding black or white bars in the data track of said first and second encoded symbols.

17. The system of claim 16 in which said first and second detector means generates analog signals in response to sensing said data and clocking tracks, said first and second signal processing means includes digitizing means coupled to said first and second detecting means for outputting square wave signals representing said analog signals in which the leading and trailing edge of the clock square wave signal corresponds to the center of the corresponding data square wave signals.

18. The system of claim 17 in which said first signal processing means further includes second storage means connected to a utilizing device and coupled to the output of said first storage means, said second signal processing means further includes counter means coupled to said pulse generator means and outputting a second control pulse upon reaching a count representing the next to the last clock pulse for enabling said second storage means to store the output of said first storage means for subsequently transmitting said signals to the utilizing device.

19. The system of claim 18 in which said first signal processing means includes reset means coupled to said first storage means for resetting said register when operated thereby enabling said first storage means to store the electrical signals representing the next encoded symbol sensed by said first detector means, said counter means coupled to said reset means for operating said reset means upon counting the last clock pulse generated by said pulse generator means in response to the sensing of the last bar in the encoded symbol by said second detector means.

20. An information bearing member adapted to be scanned by energy applied thereto comprising a plurality of first coded symbols each comprising a first array of parallel bars of equal widths in which alternate bars of each array are of different colors with the first and last bar of said first array always being of the same color, said member further comprising a second coded symbol comprising a first array of parallel bars of varying widths and a second array of parallel bars of equal widths in which the alternate bars of both arrays are of different color with the first and last bars of said first array always being of different colors.

* * * * *

UNITED STATES PATENT AND TRADEMARK OFFICE
CERTIFICATE OF CORRECTION

PATENT NO. : 4,259,569

DATED : March 31, 1981

INVENTOR(S) : Barry E. Passer and George A. Sculley

It is certified that error appears in the above—identified patent and that said Letters Patent are hereby corrected as shown below:

Column 12, line 20, "equal" should be -- varying --.

Signed and Sealed this

Fourth Day of August 1981

[SEAL]

Attest:

GERALD J. MOSSINGHOFF

Attesting Officer  Commissioner of Patents and Trademarks